United States Patent
Peck, Jr. et al.

(10) Patent No.: US 6,741,258 B1
(45) Date of Patent: May 25, 2004

(54) DISTRIBUTED TRANSLATION LOOK-ASIDE BUFFERS FOR GRAPHICS ADDRESS REMAPPING TABLE

(75) Inventors: John C. Peck, Jr., San Francisco, CA (US); Sridhar P. Subramanian, Sunnyvale, CA (US); Scott Waldron, Belmont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/477,216

(22) Filed: Jan. 4, 2000

(51) Int. Cl.[7] .............................................. G06F 12/10
(52) U.S. Cl. ...................................... 345/568; 345/520
(58) Field of Search ................................. 345/520, 531, 345/535, 568; 711/206, 133, 166, 207, 154, 146, 208, 1, 205, 159, 169, 202; 712/34; 710/260

(56) References Cited

U.S. PATENT DOCUMENTS

| | | | | |
|---|---|---|---|---|
| 4,774,653 A | * | 9/1988 | James | 711/207 |
| 5,463,750 A | * | 10/1995 | Sachs | 711/169 |
| 5,905,509 A | * | 5/1999 | Jones et al. | 345/520 |
| 5,906,001 A | * | 5/1999 | Wu et al. | 711/154 |
| 5,949,436 A | * | 9/1999 | Horan et al. | 345/501 |
| 5,960,463 A | * | 9/1999 | Sharma et al. | 711/206 |
| 6,108,766 A | * | 8/2000 | Hahn et al. | 712/34 |

* cited by examiner

*Primary Examiner*—Matthew C. Bella
*Assistant Examiner*—Dalip Singh
(74) *Attorney, Agent, or Firm*—Farjami & Farjami LLP

(57) ABSTRACT

A system includes a main memory device which stores information for translating a virtual address into a physical address in response to one of a plurality of processing devices. A memory control/interface device is coupled to the main memory device. The memory control/interface device, which may access the information stored in the main memory device, has a separate translation look-aside buffer for each processing device. Each translation look-aside buffer can buffer the information for use in translating in response to the respective processing device.

15 Claims, 7 Drawing Sheets

DISTRIBUTED TRANSLATION LOOK-ASIDE BUFFERS FOR GRAPHICS ADDRESS REMAPPING TABLE

TECHNICAL FIELD OF THE INVENTION

The present invention relates generally to memory systems and, more particularly, a distributed translation look-aside buffers for a Graphics Address Remapping Table (GART).

BACKGROUND OF THE INVENTION

Modern computer graphics applications require high-speed processing in order to generate realistic images on a display device (e.g., a computer monitor). Within a computer, the requisite processing power for modern graphics applications is provided by a host processor and a graphics controller. Large blocks of data and other information must travel to, from, and between the host processor and the graphics controller during operation.

With the accelerated graphics port (AGP) architecture, data used by both the graphics controller and the host processor can be stored in system (host) memory. The AGP architecture provides a dedicated, high speed port through which data can be moved between the graphics controller and system memory. The AGP architecture utilizes host paging. As such, blocks of memory with contiguous linear addresses may not be physically contiguous in system memory. Specifically, each linear address corresponds to some location in a "virtual" memory. In the virtual memory, data for certain structures (e.g., texture maps) are stored in contiguous locations. In the physical system memory, however, the data may actually be stored in non-contiguous locations.

Because the host processor and the graphics controller must see data structures as contiguous blocks, the AGP architecture is equipped with core logic to translate the virtual linear addresses into corresponding physical addresses. This translation is accomplished with a memory-based graphics address remapping table (GART). The GART supports a mapping function between virtual addresses and physical addresses. With this mapping in the AGP architecture, a processing device (e.g., the host controller or the graphics controller) may use a translation look-aside buffer for performing memory accesses. In general, the translation look-aside buffer functions to temporarily store data and information for performing translations.

With previously developed techniques, a single translation look-aside buffer is provided to support all processing devices. The processing devices share use of the translation look-aside buffer. With a single, shared translation look-aside buffer, contention arises between the processing devices for its use. For example, one processing device may direct that certain data be stored into the buffer for a desired translation, but before the translation has been completed, another processing device may direct that other data be stored into the buffer. This other data overwrites the previously stored data. Thus, in order to complete the translation desired by the first processing device, the first data must be re-written into the translation look-aside buffer. Accordingly, the contention between processing devices diminishes performance.

Also, with previously developed techniques, multiple interconnections are required to support all of the processing devices sharing a single translation look-aside buffer. Because each of these interconnections must run from an interface device associated with a respective processing device to the translation look-aside buffer, the interconnections may be relatively long. A longer length connection increases the delay for any signals traveling thereon, and thus makes it more difficult to achieve design time requirements.

In an AGP architecture utilizing a memory-based GART, the translation look-aside buffer is initially searched for information which can be used for translation. If the desired information is not found within the translation look-aside buffer, a "miss" occurs and the information must be retrieved from main memory. With previously developed techniques utilizing a single, shared translation look-aside buffer for multiple processing devices, if a miss occurs because of a search request by one processing device, any search request by another processing device is delayed while action is taken in response to the miss. Taken collectively across all processing devices, this increases the amount of time required for translation, and thus further reduces performance.

SUMMARY

The disadvantage and problems associated with previously developed techniques have been substantially reduced or eliminated with the present invention.

In accordance with one embodiment of the present invention, a system includes a main memory device which stores information for translating a virtual address into a physical address in response to one of a plurality of processing devices. A memory control/interface device is coupled to the main memory device. The memory control/interface device, which may access the information stored in the main memory device, has a separate translation look-aside buffer for each processing device. Each translation look-aside buffer can buffer the information for use in translating in response to the respective processing device.

In accordance with another embodiment of the present invention, a memory control/interface device includes a plurality of translation look-aside buffers each associated with a separate processing device. Each translation look-aside buffer can buffer information for use in translating a linear address received from the respective processing device. A GART walk device is coupled to the plurality of translation look-aside buffers. The GART walk device can execute a table walk process to retrieve the information from a main memory device for buffering in translation look-aside buffers.

A technical advantage of the present invention includes providing a separate translation look-aside buffer for each processing device in an accelerated graphics port (AGP) architecture utilizing a Graphics Aperture Remapping Table (GART). With this arrangement, there is no contention for use of the same buffer storage space by the various processing devices. Also, the physical implementation of each translation look-aside buffer can be localized for the respective processing device, thereby eliminating the relatively long interconnections which would otherwise be needed to connect multiple processing devices to a single, shared translation look-aside buffer. This makes it easier to achieve design timing requirements. Furthermore, a better degree of concurrency is achieved when several processing devices simultaneously issue translation requests. More specifically, any "miss" which occurs because of a search request by one processing device in its respective translation look-aside buffer is masked from the other processing devices. The other processing devices are thus still able to search their own respective translation look-aside buffers. Because search requests by several processing devices can proceed simultaneously, the overall operation of the system is enhanced.

Other important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments of the present invention and their advantages are best understood by referring to FIGS. 1–7 of the drawings. In the various drawings, like numerals are used for like and corresponding parts.

Distributed TLB System

Figure 1:
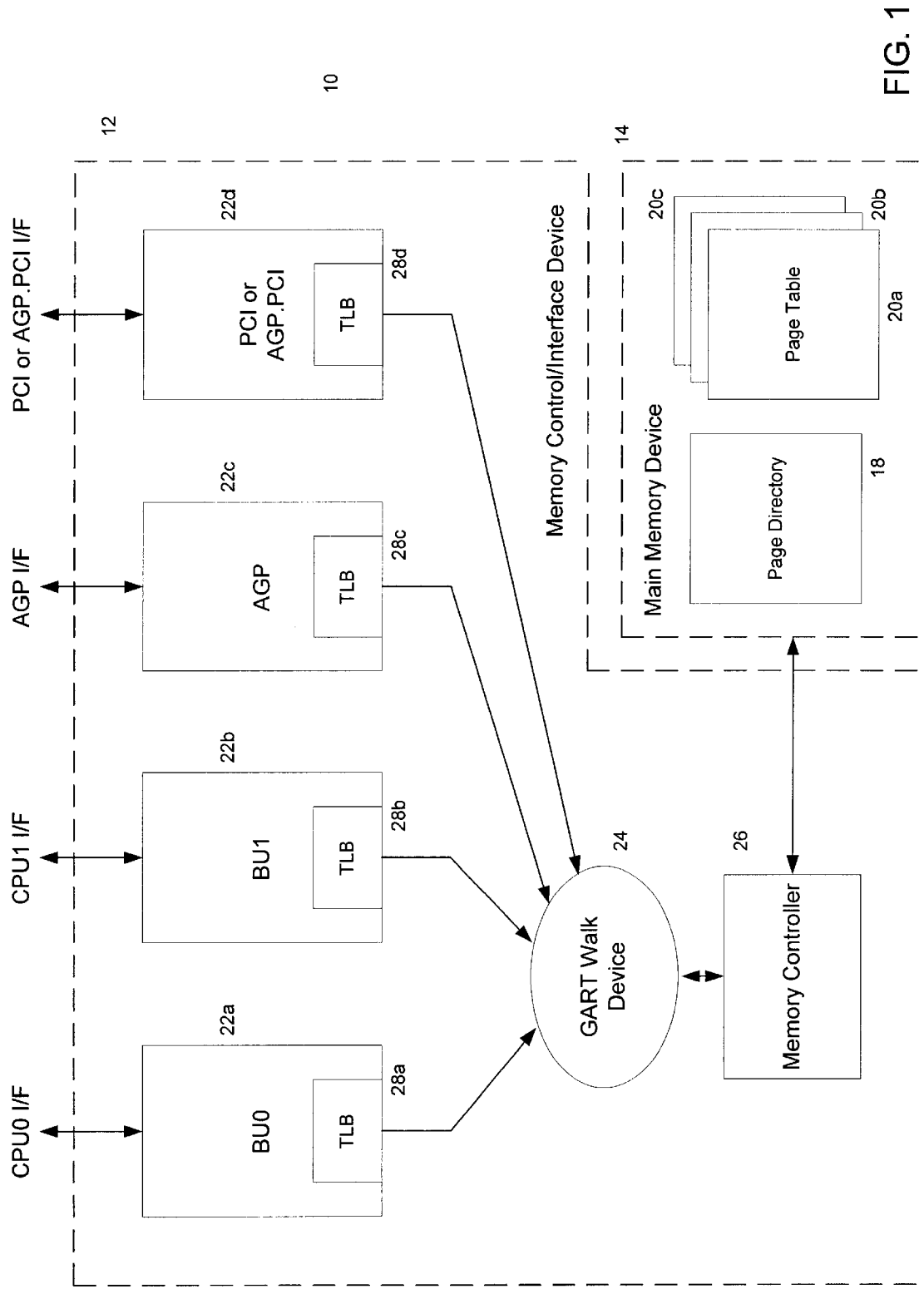
FIG. 1 is a block diagram for a Graphics Aperture Remapping Table (GART) system with distributed translation look-aside buffers (TLBs), according to an embodiment of the present invention.

FIG. 1 is a block diagram for a Graphics Aperture Remapping Table (GART) system 10 with distributed translation look-aside buffers (TLBs), according to an embodiment of the present invention. System 10 includes a memory control/interface device 12 and a main memory device 14.

Memory control/interface device 12 and main memory device 14 can each be an integrated circuit (IC) device separately packaged in suitable packaging (e.g., plastic, ceramic, micro-ball grid array (MBGA), or chip scale package (CSP)) with suitable leads or other connecting points (not shown) extending therefrom. Each of memory control/interface device 12 and main memory device 14 may comprise one or more semiconductor chips, wherein a "chip" is a separate piece of semiconductor material having an integrated circuit. Memory control/interface device 12 and main memory device 14 may be connected——for example, on a printed circuit board (PCB)——by a connection 16. As used herein, the terms "connected," "coupled," or any variant thereof, mean any connection or coupling, either direct or indirect between two or more elements; the connection or coupling can be logical or physical.

Main memory device 14 generally functions to store data and information which is routed through one or more buses (e.g., a peripheral component interface (PCI) bus or accelerated graphics port (AGP) PCI bus) to and from various processing devices (e.g., a central processing unit (CPU), an AGP chipset, or a PCI controller). Main memory device 14 can be implemented as any suitable IC memory, and is typically a dynamic random access memory (DRAM).

As depicted, main memory device 14 is populated with a number of tables for storing information. These tables include a page directory 18 and one or more page tables 20, which are separately designated with reference numerals 20a, 20b, and 20c. Each page table 20 includes a number of page table entries. Each page table entry specifies a base address or frame address for a respective "page" of data in main memory device 14. Page directory 18 includes a number of page directory entries. Each page directory entry specifies the base address for one of the page tables 20. Page table entries and page table directory entries are explained below in more detail. In a two-level indexing scheme for GART, entries from page directory 18 and page tables 20 are used in translating between virtual addresses and physical addresses. In a one-level indexing scheme, only entries from the page tables 20 are used for the translation between virtual addresses and physical addresses.

Memory control/interface device 12 generally functions to control the access (storage and retrieval) of data and information to and from main memory device 14. Furthermore, memory control/interface device 12 functions as an interface between main memory device 14 and the one or more buses through which information or data is retrieved from or routed to main memory device 14. As depicted, memory control/interface device 12 includes a number of interface units 22, a GART walk device 24, and a memory controller 26.

Interface units 22, which are separately designated with reference numerals 22a, 22b, 22c, and 22d, each function to support an interface between main memory device 14 and a specific processing device connected to memory control/interface device 12 by a respective bus. Each such bus allows the respective processing device to access main memory device 14 for the storage and retrieval of data and information. As depicted, interface unit 22a may comprise a first bus unit (BU) which supports a first central processing unit (CPU). Similarly, interface unit 22b may comprise a second bus unit (BU) for supporting a second central processing unit (CPU1). Interface unit 22c may comprise a unit for supporting an accelerated graphics port (AGP) chipset. Interface unit 22d may comprise a unit for supporting a peripheral component interface (PCI) controller or an AGP/PCI controller.

Each interface unit 22 comprises a separate translation look-aside buffer (TLB) 28. In particular, interface units 22a, 22b, 22c, and 22d include translation look-aside buffers 28a, 28b, 28c, and 28d, respectively. In one embodiment, translation look-aside buffers 28a and 28b, contained within interface units 22a and 22b for respective central processing units, each can be implemented as an eight-entry, fully-associative cache. Translation look-aside buffer 28c, contained within interface unit 22c for the AGP chipset, can be implemented as a sixteen-entry, fully-associative cache. Translation look-aside buffer 28d, contained within interface unit 22d for the PCI or AGP/PCI controller, can be implemented as a four-entry, fully-associative cache.

Each translation look-aside buffer 28 functions to store (at least temporarily) information which is used for translating between virtual addresses and physical addresses. During operation, when a particular virtual address is to be translated, an interface unit 22 searches its respective translation look-aside buffer 28 for information (e.g., page table entries) to execute the translation. If such information is found in the translation look-aside buffer 28, there is a "hit" and the information is used to make the translation. On the other hand, if such information is not found in the translation look-aside buffer 28, there is a "miss" and the desired information must be retrieved from main memory device 14. For each miss, a translation look-aside buffer 28 will make a request to obtain the information necessary for performing the desired translation.

GART walk device 24, which is coupled to each of interface units 22, receives requests from the various translation look-aside buffers 28. GART walk device 24 arbitrates between the different requests. In response to each request, GART walk device 24 generally functions to coordinate the retrieval of information (e.g., entries) from page directory 18 and page tables 20 in main memory device 14. This process of retrieving information from page table 20 and page directory 18 constitutes the table walk process. GART walk device 24 may include one or more state machines which implement the arbitration and the table walk processes. GART walk device 24 may ultimately retrieve the base addresses for physical data pages from the table entries in memory. Data desired by a particular processing unit may be located within each such physical data page. In one embodiment, GART walk device 24 may comprise a page directory cache for storing page directory entries from page directory 18 when the two-level indexing scheme is used.

Memory controller 26 is coupled between GART walk device 24 and main memory device 14. Memory controller 26 generally functions to control the actual storage into and retrieval out of main memory device 14. In addition, memory controller 26 may cooperate with GART walk device 24 during a table walk process to retrieve page directory entries and page table entries from page directory 18 and page tables 20.

In operation for GART system 10, interface units 22 may receive linear addresses for data that are desired by the respective processing devices. The linear addresses correspond to locations in a virtual memory. This virtual memory is not the same as the physical memory of main memory device 14 where the desired data may actually be stored. Thus, in order to retrieve the data from main memory device 14, the virtual linear addresses must be translated into corresponding physical addresses.

Each interface unit 22 operates independently to support the translation of linear addresses for its corresponding processing device. Whenever an interface unit 22 receives a particular linear address, the interface unit 22 searches its respective translation look-aside buffer 28 for information (e.g., page table entries and physical addresses) to execute the translation. If the information is not contained with the look-aside buffer 28 (i.e., there is a "miss"), the translation look-aside buffer 28 will issue a request to GART walk device 24 in order to obtain the desired information from main memory device 14.

GART walk device 24 receives the various requests from translation look-aside buffers 28 and then arbitrates to determine an order for processing the requests. GART walk device 24 then performs the GART walk process for each request according to the determined order. In the GART table walk process, information is retrieved from page directory 18 and/or page tables 20 for use in translating a virtual linear address into a physical address.

The information for performing a translation is brought into the respective translation look-aside buffer 28 (via GART table walk device 24 and memory controller 26). The respective interface unit 22 then uses the information to translate the virtual address into a physical address. Once the physical address has been derived, it is used to access the data desired by the respective processing device.

Because each interface unit 22 which supports a corresponding processing device has its own separate translation look-aside buffer 28, there is no contention for use of the same buffer storage space by the various processing devices. Thus, the information in any given translation look-aside buffer 28 is not overwritten by the action of other processing devices not associated with that particular translation look-aside buffer 28. Accordingly, the process of translating a linear address into a physical address——and ultimately, retrieving data from physical memory——is made more efficient. Also, the physical implementation of each translation look-aside buffer 28 can be localized at the interface unit 22 for the respective processing device, thereby eliminating the relatively long interconnections which would otherwise be needed to connect multiple processing devices to a single, shared translation look-aside buffer. This makes it easier to achieve design timing requirements. Furthermore, a better degree of concurrency is achieved when several processing devices simultaneously issue translation requests. More specifically, any "miss" which occurs because of a search request by one processing device in its respective translation look-aside buffer 28 is masked from the other processing devices. The other processing devices are thus still able to search their own respective translation look-aside buffers 28. Because search requests by several processing devices can proceed simultaneously, the overall operation of the system is enhanced.

GART Walk Device

Figure 2:
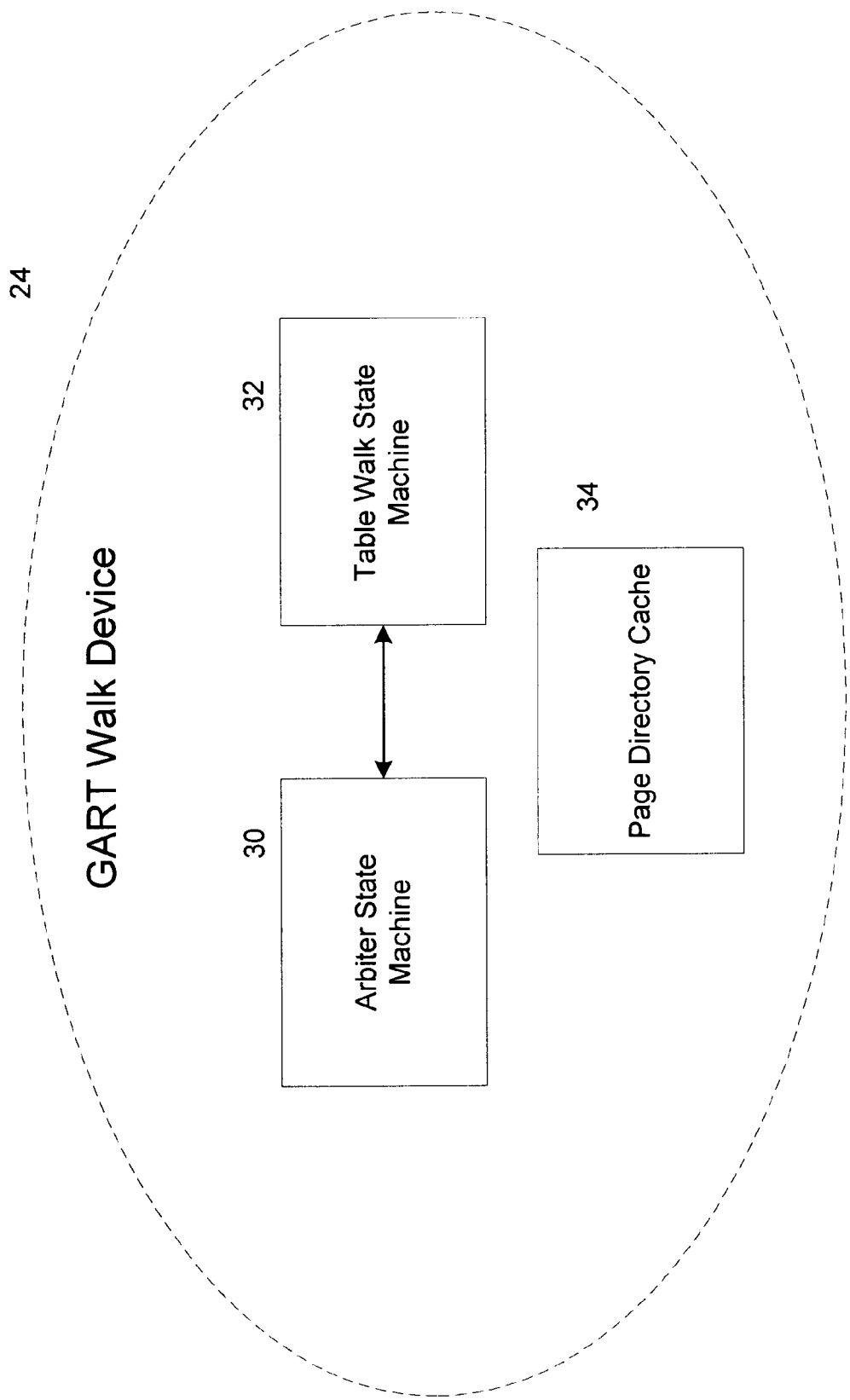
FIG. 2 is a block diagram of a GART walk device, according to an embodiment of the present invention.

FIG. 2 is a block diagram for GART walk device 24, according to an embodiment of the present invention. GART walk device 24 can be implemented as one or more state machines and cache memory for performing the functionality described herein. As depicted, GART walk device 24 includes an arbiter state machine 30, a table walk state machine 32, and a page directory cache 34.

Arbiter state machine 30 is in communication with each of translation look-aside buffers 28 provided in memory control/interface device 12. Arbiter state machine 30 generally functions to arbitrate between requests from the various translation look-aside buffers 28. In one embodiment, arbiter state machine 30 arbitrates at each clock cycle on a priority/round-robin basis and grants use of table walk state machine 32 to one of the translation look-aside buffers 28. A state diagram for the operation of arbiter state machine 30 is illustrated and described below with reference to FIG. 3.

Table walk state machine 32 is coupled to arbiter state machine 30. Table walk state machine 32 is in communication with memory controller 26. Table walk state machine 32 generally functions to implement the table walk process within memory control/interface device 12. That is, table walk state machine 32 coordinates the retrieval of information (e.g., page directory entries and page table entries) from main memory device 14 for use in translating a linear address into a physical address. A state diagram for table walk state machine 32 is illustrated and described below with reference to FIG. 6.

For a two-level indexing scheme, page directory cache 34 functions to store page directory entries from page directory 18 in main memory device 14. In one embodiment, page directory cache 34 may be implemented as an eight-entry, fully associative cache.

In operation for GART walk device 24, one or more requests are received at arbiter state machine 30 from translation look-aside buffers 28. After arbiter state machine 30 has arbitrated among the requests, table walk state machine operates upon the output request from arbiter state machine 30. In particular, table walk state machine 32 performs the table walk process for the output request. During the table walk process, some information may be retrieved out of main memory device 14 and temporarily stored in page directory cache 34.

State Diagram for Arbiter State Machine

Figure 3:
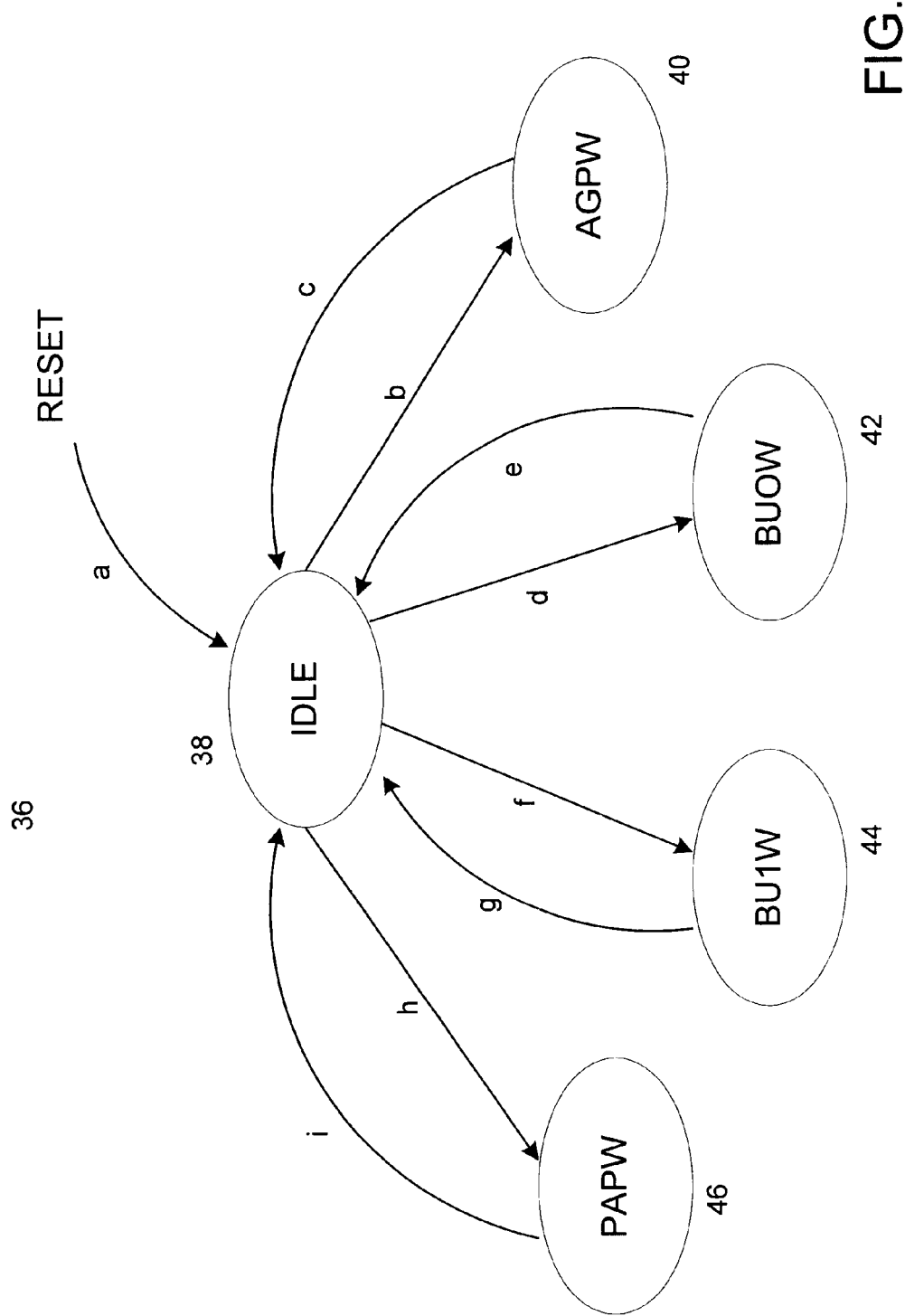
FIG. 3 is a state diagram for an arbiter state machine, according to an embodiment of the present invention.

FIG. 3 is a state diagram 36 for arbiter state machine 30, according to an embodiment of the present invention. State diagram 36 corresponds to the operation of arbiter state machine 30, which arbitrates between requests from various translation look-aside buffers 28.

State diagram 36 includes a number of states and transitions therebetween. The states in state diagram 36 include an idle (IDLE) state 38, an AGP table walk (AGPW) state 40, a first bus unit table walk (BU0W) state 42, a second bus unit table walk (BU1W) state 44, and a PCI or AGP/PCI table walk (PAPW) state 46.

Arbiter state machine 30 enters into IDLE state 38 when GART walk device 24 is reset (as indicated by arrow a). At IDLE state 38, arbiter state machine 30 waits for a request from any translation look-aside buffer 28. Arbiter state machine is ready to grant use of table walk state machine 32 (for performing the table walk process) to one of translation look-aside buffers 28.

Arbiter state machine 30 moves from IDLE state 38 into AGPW state 40 (as indicated by arrow b) when the table walk process is initiated in response to a request from translation look-aside buffer 28c of interface unit 22c supporting an AGP chipset. At AGPW state 40, arbiter state machine 30 waits for table walk state machine 32 to perform the table walk process pursuant to the request from translation look-aside buffer 28c. At this time, information (e.g., page directory entries and page table entries) may be retrieved from main memory device 14 and stored into translation look-aside buffer 28c. This information may be used to perform a translation of a virtual address into a physical address. When the table walk process has been completed for this particular request, arbiter state machine 30 returns from AGPW state 40 to IDLE state 38 (as indicated by arrow c).

Arbiter state machine 30 moves from IDLE state 38 into BU0W state 42 (as indicated by arrow d) when the table walk process is initiated in response to a request from translation look-aside buffer 28a of interface unit 22a supporting the first central processing unit. At BU0W state 42, arbiter state machine 30 waits for table walk state machine 32 to perform the table walk process pursuant to the request from translation look-aside buffer 28a. At this time, information for performing a translation may be retrieved from main memory device 14 and stored into translation look-aside buffer 28a. When the table walk process has been completed for this particular request, arbiter state machine 30 returns from BU0W state 42 to IDLE state 38 (as indicated by arrow e).

Arbiter state machine 30 moves from IDLE state 38 into BU1W state 44 (as indicated by arrow f) when the table walk process is initiated in response to a request from translation look-aside buffer 28b of interface unit 22b supporting the second central processing unit. At BU1W state 44, arbiter state machine 30 waits for table walk state machine 32 to perform the table walk process in response to the request from translation look-aside buffer 28b. At this time, information may be retrieved from main memory device 14 and stored into translation look-aside buffer 28b. When the table walk process has been completed for this particular request, arbiter state machine 30 returns from BU1W state 44 to IDLE state 38 (as indicated by arrow g).

Arbiter state machine 30 moves from IDLE state 38 into PAPW state 46 (as indicated by arrow h) when the table walk process is initiated in response to a request from translation look-aside buffer 28d of interface unit 22d supporting the PCI controller or the AGP/PCI controller. At PAPW state 46, arbiter state machine 30 waits for table walk state machine 32 to perform the table walk process pursuant to the request from translation look-aside buffer 28d. At this time, information for executing a translation may be retrieved from main memory device 14 and stored into translation look-aside buffer 28d. When the table walk process has been completed for this particular request, arbiter state machine 30 returns from PAPW state 46 to IDLE state 38 (as indicated by arrow i).

In operation, at IDLE state 38, arbiter state machine 30 arbitrates at each clock cycle on a round-robin basis in order to grant use of table walk state machine 32 to the translation look-aside buffers 28. That is, arbiter state machine 30 sequentially queries or prompts each translation look-aside buffer 28 and gives priority to any buffer 28 which has a pending request at the time it is queried. Once access has been granted, the table walk process is performed pursuant to the request. When the table walk process has been completed, arbiter state machine 30 resumes querying of the translation look-aside buffers 28. As arbiter state machine 30 waits for the completion of processing at one of AGPW state 40, BU0W state 42, BU1W state 44, or PAPW state 46, other requests for a table walk process can be pipelined for subsequent execution.

Address Translation Structure

Figure 4:
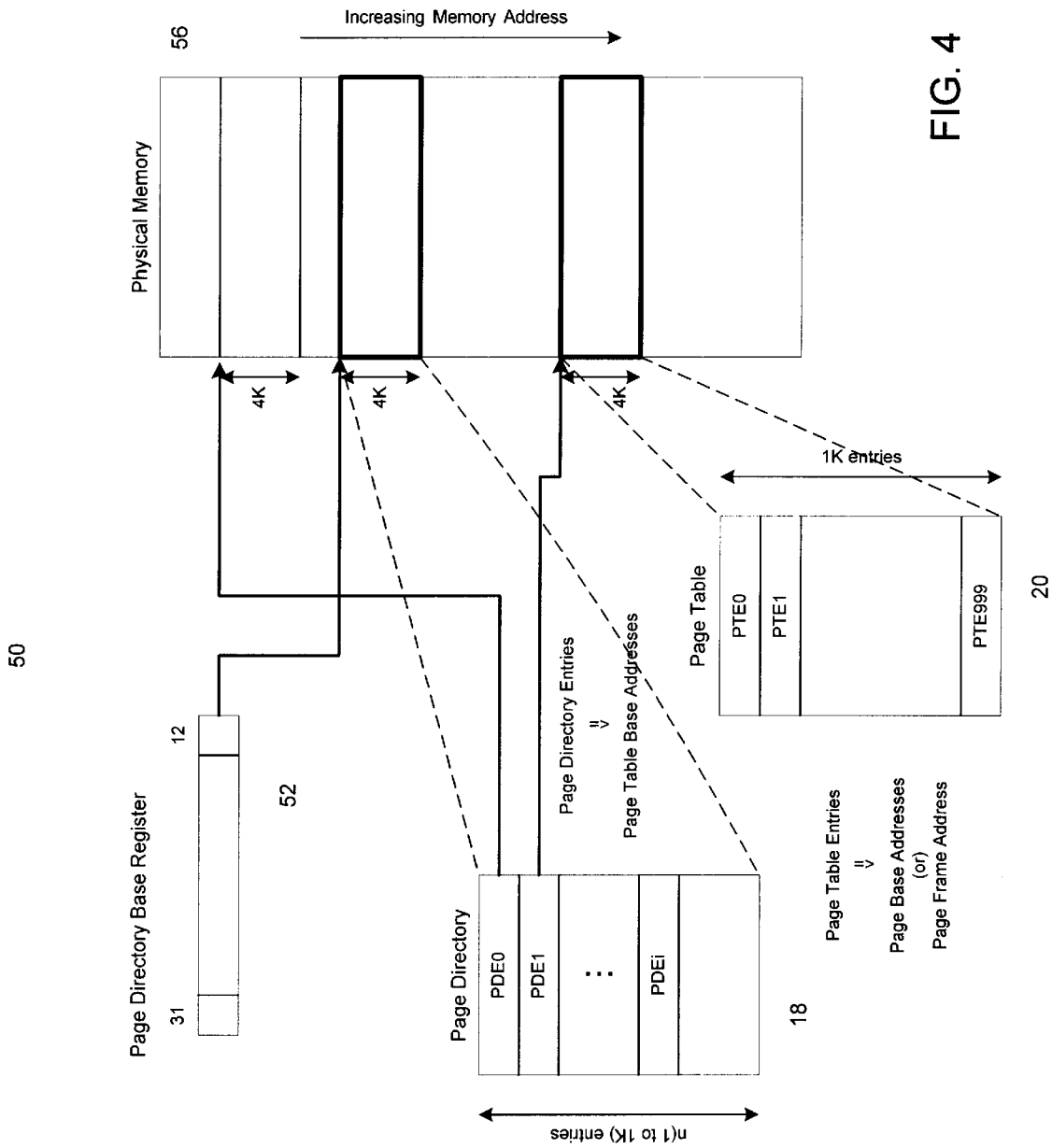
FIG. 4 illustrates a structure for translating virtual addresses into physical addresses in the GART system.

FIG. 4 illustrates a structure 50 for translating virtual addresses into physical addresses in GART system 10. A virtual address may comprise 32 bits [31:0]. The first twelve bits [11:0] can correspond to a page offset, and the remaining twenty bits [31:12] can correspond to a virtual page address. In the table walk process, the 32-bit virtual address is used to access page directory entries and/or page table entries in order to derive a physical address, which may also comprise 32 bits [31:0]. In the physical address, the first twelve bits [11:0] are for a page offset and can be the same as the first twelve bits of the virtual address. The other bits of the physical address, [31:12], are for a physical page address.

Referring to FIG. 4, a virtual page address (i.e., bits [31:12] of the virtual address) can be stored in a page directory base register 52. The virtual page address points to the base address of a page directory 18 in a physical memory 56, which is an implementation of main memory device 14 (FIG. 1).

As shown, page directory 18 may comprise 4K of information. Page directory 18 includes a number of page directory entries (e.g., PDE0, PDE1, . . . , PDEi, etc.). In one embodiment, page directory 18 comprises n(1 to 1 K) page directory entries, where n is equal to the number of page tables required to perform translation for a range of virtual addresses requested by a given application. Each page directory entry specifies a page table base address. That is, each page directory entry points to the base address for a particular page table 20.

Each page table 20 may include 4K of information. A page table 20 comprises a number of page table entries (e.g., PTE0, PTE1, . . . , PTE999). As depicted, page table 20 comprises 1 K entries. Each page table entry specifies a page base address. That is, each page table entry points to the base address for a particular page of information in physical memory 56. Alternatively, each page table entry may specify a page frame address, which defines the beginning and end of a page in physical memory 56.

Structure 50 depicted in FIG. 4 implements a two-level indexing scheme for translation between virtual addresses and physical addresses. Page directory 18 is utilized for the first level of indexing, and page table 20 is utilized for the second level of indexing. In an alternative embodiment, a one-level indexing scheme is implemented with a structure using only page tables for translation between virtual and physical addresses.

Two-Level Indexing Scheme for GART Translation

Figure 5:
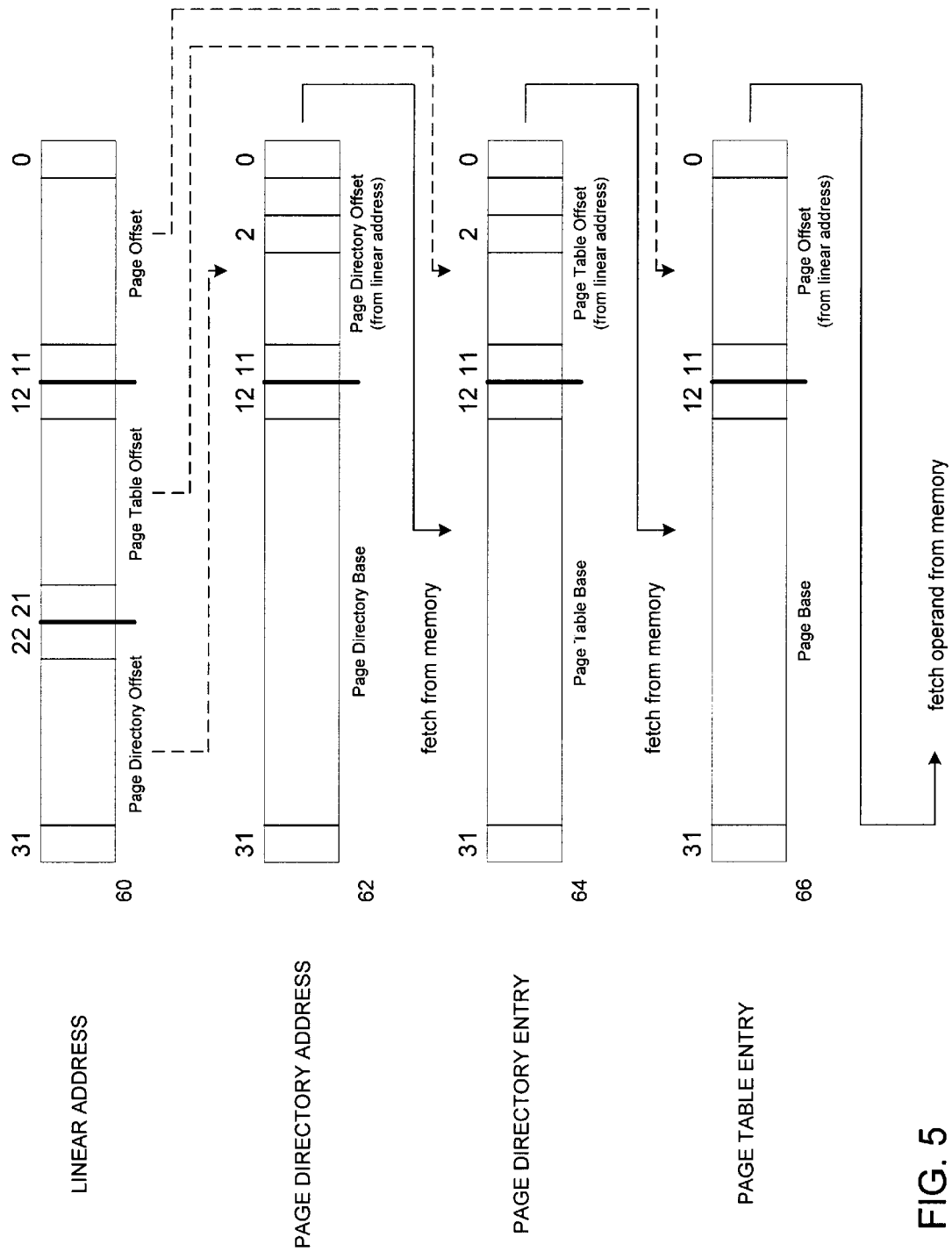
FIG. 5 illustrates a two-level indexing scheme for translation between a virtual address and a physical address in the GART system.

FIG. 5 illustrates a two-level indexing scheme for translation between a virtual address and a physical address in GART system 10. The physical address stores data which is desired for use as an operand by a particular processing device (e.g., a central processing unit, an AGP chipset, or a PCI controller). The virtual address comprises elements which allow the physical address to be accessed after two levels of indexing. The first level of indexing utilizes a page directory. The second level of indexing utilizes one or more page tables.

The virtual address can be a linear address 60 which comprises 32 bits [31:0]. The first twelve bits [11:0] are provided for a page offset. The page offset specifies an offset from the base address of a particular page, and thus points to a particular location in the page. At this location, the desired operand data is stored. The next ten bits [21:12] of linear address 60 are provided for a page table offset. The page table offset specifies an offset from the base address of a particular page table, and thus points to a specific location in such page table. This location contains information pointing to the page at which the desired operand data is stored. The last ten bits [31:22] of the linear address are provided for a page directory offset. The page directory offset specifies an offset from the base address of a page directory, and thus points to a specific location in such page directory. This location contains information pointing to the page table.

For indexing, a page directory address 62 comprises 32 bits [31:0]. The first twelve bits [11:0] of page directory address 62 may include the page directory offset from linear address 60. The remaining twenty bits [31:12] correspond to a page directory base. The page directory base is the base address in memory for the page directory. The page directory offset in the page directory address 62 specifies an offset from the base address of the page directory, and thus points to a particular location of the page directory. A fetch from memory at this location yields a page directory entry 64.

Page directory entry 64 comprises 32 bits [31:0]. The first twelve bits [11:0] of page directory entry 64 may include the page table offset from linear address 60. The remaining twenty bits [31:12] correspond to a page table base, which is the base address for the page table. The page table offset in page directory entry 64 specifies an offset from the base address of the page table, and thus points to a particular location of the page table. A fetch from memory at this location yields a page table entry 66.

Page table entry 66 comprises 32 bits [31:0]. The first twelve bits [11:0] of page table entry 66 may include the page offset from linear address 60. The remaining bits [31:12] of page table entry 66 correspond to a page base. The page base is the base address in memory for the desired page. The page offset specifies an offset from the base address of the page, and thus points to a particular location of the page. A fetch from memory at this location yields the desired data operand.

State Diagram for Table Walk State Machine

Figure 6:
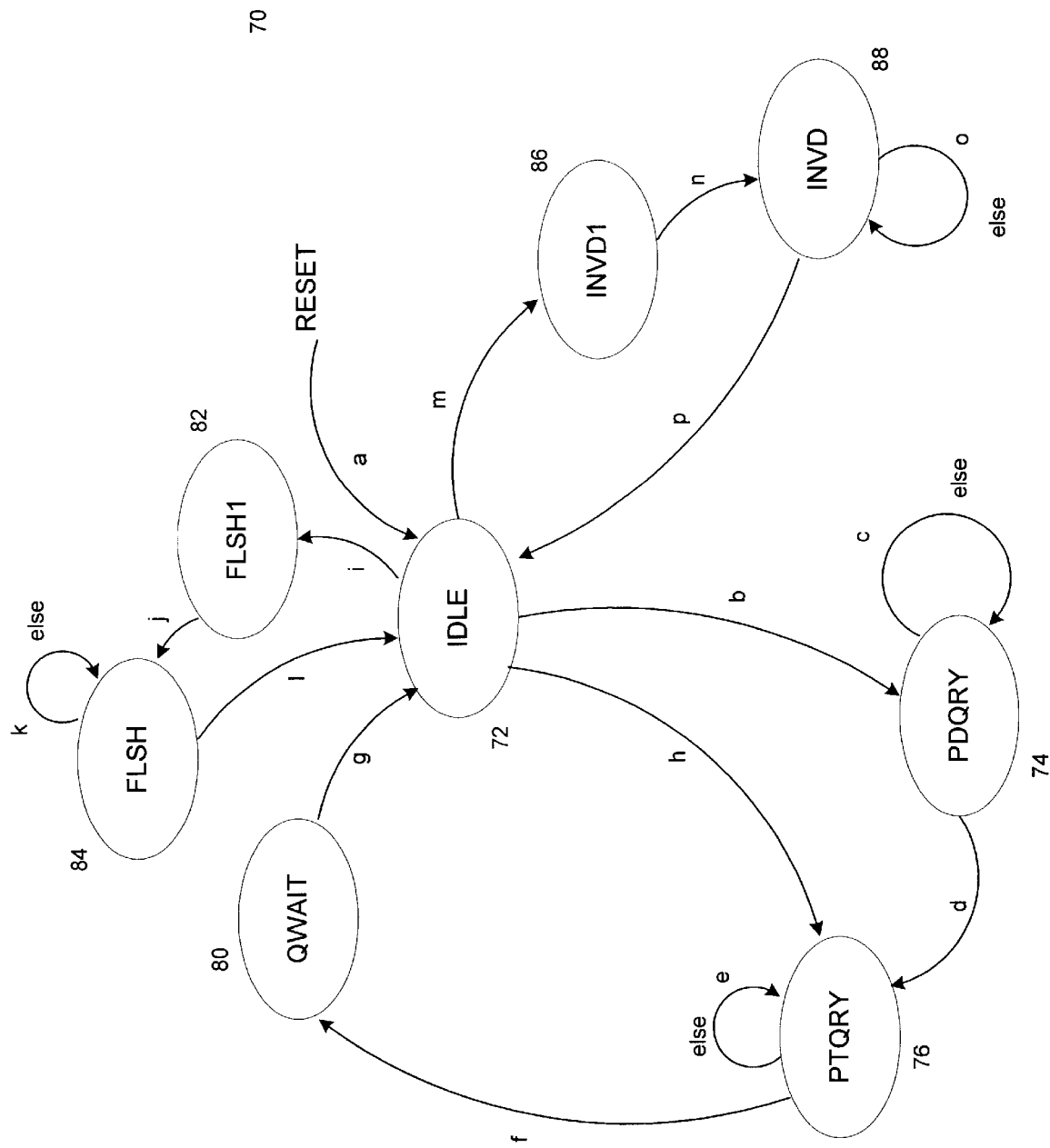
FIG. 6 is a state diagram for a table walk state machine, according to an embodiment of the present invention.

FIG. 6 is a state diagram 70 for table walk state machine 32 (FIG. 2), according to an embodiment of the present invention. State diagram 70 corresponds to the operation of table walk state machine 32, which performs the table walk process.

State diagram 70 includes a number of states and transitions therebetween. These states in state diagram 70 include an idle (IDLE) state 72, a page directory query (PDQRY) state 74, a page table query (PTQRY) state 76, a query wait (QWAIT) state 80, a flush one (FLSH1) state 82, a flush (FLSH) state 84, an invalidate one (INVD1) state 86, an invalidate (INVD) state 88.

Table walk state machine 32 enters into IDLE state 72 when GART walk device 24 is reset (as indicated by arrow a). Table walk state machine 32 remains in IDLE state 72 until its use is granted by arbiter state machine 30 to perform a table walk process, or alternatively, table walk state machine 32 receives a flush command or an invalidate command.

If the use of table walk state machine 32 is granted to perform a table walk process, then in a two-level indexing scheme, table walk state machine 32 moves from IDLE state 72 into PDQRY state 74 (as indicated by arrow b). At PDQRY state 74, table walk state machine 32 constructs an address to read a page directory entry. Specifically, table walk state machine 32 sends a page directory address to memory controller 26 along with request to read from that address. The page directory address points to a page directory entry. Table walk state machine 32 waits for a response from memory controller 26 at "else" (as indicated by arrow c).

When memory controller 26 returns a response, table walk state machine 32 moves from PDQRY state 74 to PTQRY state 76 (as indicated by arrow d). At PTQRY state 76, table walk state machine 32 has obtained a page directory entry and uses that to construct an address to read a page table entry. In particular, table walk state machine 32 sends a request for memory controller 26 to read from the page directory entry. The page directory entry points to a page table entry. Table walk state machine 32 waits for a response from memory controller 26 at "else" (as indicated by arrow e).

When memory controller 26 returns a response, table walk state machine 32 moves to QWAIT state 80 (as indicated by arrow f). At QWAIT state 80, table walk state machine 32 waits one or more clock cycles in order to synchronize within GART system 10. After waiting, table walk state machine 32 moves from QWAIT state 80 back to IDLE state 72 (as indicated by arrow g).

Alternatively, in a one-level indexing scheme, if the use of table walk state machine 32 is granted to perform a table walk process, table walk state machine 32 moves from IDLE state 72 into PTQRY state 76 (as indicated by arrow h). This circumvents PDQRY state 74.

A flush command flushes all of the entries from each translation look-aside buffer 28. The flush command essentially functions as a clear for the cache memory implementations of translation look-aside buffers 28. If a flush command is received by table walk state machine 32, it moves from IDLE state 72 into FLSH1 state 82 (as indicated by arrow i). FLSH1 state 82 is provided for synchronization. From FLSH1 state 82, table walk state machine 32 moves into FLSH state 84 (as indicated by arrow j). At FLSH state 84, table walk state machine 32 directs that each translation look-aside buffer 28 clear its entries. Table walk state machine 32 waits for a response from each translation look-aside buffer 28 at "else" (as indicated by arrow k). After responses have been returned from translation look-aside buffers 28, table walk state machine 32 moves from FLSH state 84 back to IDLE state 72 (as indicated by arrow l).

An invalidate command invalidates or erases a particular entry within a translation look-aside buffer 28, such entry being identified by a configuration register. If an invalidate command is received by table walk state machine 32, it moves from IDLE state 72 into INVD1 state 86 (as indicated by arrow m). INVD1 state 86 is provided for synchronization. From INVD1 state 86, table walk state machine 32 moves into INVD state 88 (as indicated by arrow n). At INVD state 88, table walk state machine 32 issues an invalidate order to the relevant translation look-aside buffer 28 directing that the specific entry be invalidated. Table walk state machine 32 then waits at "else" (as indicated by arrow o) for a response from the translation look-aside buffer. After the translation look-aside buffer 28 returns a response, table walk state machine 32 moves from INVD state 88 back to IDLE state 72 (as indicated by arrow p).

Flow Diagram for Table Walk

Figure 7:
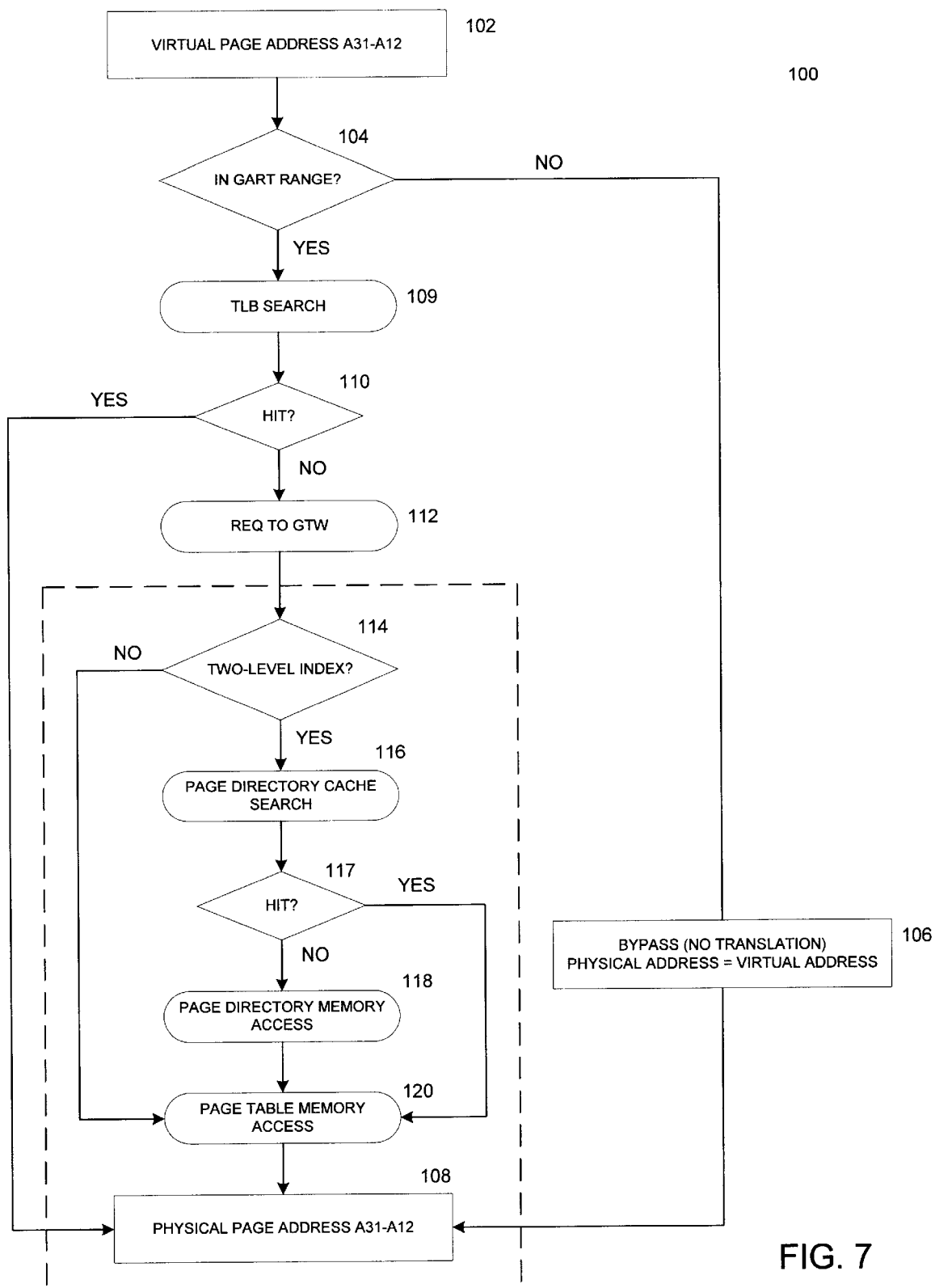
FIG. 7 is a flow diagram of a method for translating a virtual address into a page address, according to an embodiment of the present invention.

FIG. 7 is a flow diagram of a method 100 for translating a virtual address into a page address, according to an embodiment of the present invention. Method 100 may correspond to the operation of GART system 10.

Method 100 begins its step 102 where a virtual page address is received at an interface unit 22 from a respective processing device (e.g., CPU, AGP controller, or PCI controller) which desires to access data from physical memory. The virtual page address may include 32 bits [31:0] of information. A portion of this virtual page address (i.e., bits [31:12]) is used during method 100.

At step 104, the interface unit 22 determines whether the virtual page address is within range for translation. If the virtual page address is not within range for translation, then at step 106 method 100 bypasses the translation process and the physical address is taken to be the same as the virtual address. At step 108, the physical page address is derived. In one embodiment, bits [31:12] of the physical page address are the same as bits [31:12] of the virtual page address.

Referring again to step 104, if it is determined that the virtual page address is within range for translation, then at step 109 interface unit 22 searches its translation look-aside buffer 28 for information which can be used to translate the virtual page address to a physical page address. At step 110, interface unit 22 determines whether the desired information is found within the translation look-aside buffer 28 (i.e., there is a "hit"). If there is a hit, then method 100 moves to step 108 where such information is used to derive the physical page address.

Otherwise, if at step 110 it is determined that the desired information is not found within the translation look-aside buffer 28 (i.e., there is a "miss"), then at step 112 interface unit 22 issues a request for the table walk process. After suitable arbitration (as discussed herein), the GART walk process is initiated within the GART walk device 24 in response to the request.

At step 114, GART walk device 24 determines whether it is operating with a two-level indexing scheme for translation between virtual addresses and physical addresses. In the two-level indexing scheme, page directory 18 is utilized for the first level of indexing and page table 20 is utilized for the second level of indexing. Alternatively, in a one-level indexing scheme, only page table 20 is utilized for translation.

Thus, if it is determined that GART walk device 24 is not operating with a two-level indexing scheme, then at step 120 GART walk device 24 accesses an entry from page table 20 in physical memory, after which the page table entry is used to derive the physical page address at step 108.

Otherwise, if it is determined that GART walk device 24 is operating with a two-level indexing scheme, then at step 116 GART walk device 24 searches its own internal cache for a page directory entry that can be used for the translation. At step 117, GART walk device 24 determines whether the desired page directory entry is located in the internal cache (i.e., there is a hit). If there is a hit, then at step 120 the page directory entry is used to access an entry from the page table 20, after which method 100 moves to step 108 where the page table entry is used to derive the physical page address.

Alternatively, if at step 117 it is determined that the desired information is not found within the internal cache (i.e., there is a miss), then at step 118 GART walk device 24 accesses an entry from page directory 18. This page directory entry is used to access an entry in page table 20 at step 120. The page table entry is then used to derive the physical page address at step 108.

Although the present invention and its advantages have been described in detail, it should be understood that various changes, substitutions, and alterations can be made therein without departing from the spirit and scope of the invention as defined by the appended claims.

What is claimed is:

1. A system comprising:
   a main memory device operable to store a plurality of information for translating a virtual address into a physical address in response to one of a plurality of processing devices; and
   a memory control/interface device coupled to the main memory device, the memory control/interface device operable to access the plurality of information stored in the main memory device, the memory control/interface device having a plurality of interface units, each of the plurality of interface units being associated with a respective one of the plurality of processing devices, each of the plurality of interface units further comprising a separate translation look-aside buffer for each processing device, each translation look-aside buffer operable to buffer at least one of the plurality of information for use in translating in response to the respective processing device, wherein each translation look-aside buffer is capable of receiving at least one of the plurality of information from the main memory device.

2. The system of claim 1 wherein the memory control/interface device comprises a GART walk device coupled to each translation look-aside buffer and operable to execute a table walk process.

3. The system of claim 2 wherein the GART walk device is operable to arbitrate between the translation look-aside buffers.

4. The system of claim 1 wherein the main memory device contains a page directory and a page table comprising the information used in translating virtual addresses into physical addresses.

5. The system of claim 4 wherein the memory control/interface device comprises a GART walk device coupled to each translation look-aside buffer and operable to coordinate retrieval of the information from the page directory and the page table.

6. The system of claim 5 wherein the GART walk device comprises a page directory and a page directory cache for storing information retrieved from the page directory.

7. The system of claim 1 wherein the memory control/interface device comprises a memory controller coupled to control the storage and retrieval of the information to and from the main memory device.

8. A memory control/interface device comprising:
    a plurality of interface units, each of the plurality of interface units associated with a separate processing device;
    a plurality of translation look-aside buffers each associated with a respective one of the plurality of interface units, each of the plurality of translation look-aside buffers further being associated with the separate processing device, each translation look-aside buffer operable to buffer a plurality of information for use in translating a linear address received from the respective processing device, wherein each translation look-aside buffer is capable of receiving at least one of the plurality of information from a main memory device; and
    a GART walk device coupled to the plurality of translation look-aside buffers and operable to execute a table walk process to retrieve the plurality of information from the main memory device for buffering in translation look-aside buffers.

9. The memory control/interface device of claim 8 wherein each translation look-aside buffer is operable to issue a request for execution of the table walk process.

10. The memory control/interface device of claim 8 wherein the GART walk device comprises a state machine for executing the table walk process.

11. The memory control/interface device of claim 8 wherein the GART walk device is operable to arbitrate between the translation look-aside buffers.

12. The memory control/interface device of claim 11 wherein the GART walk device comprises a state machine for arbitrating between the translation look-aside buffers.

13. A Graphics Address Remapping Table system comprising:
    a main memory device operable to store a page table containing a plurality of information for translating a virtual address into a physical address in response to one of a plurality of processing devices; and
    a memory control/interface device coupled to the main memory device and operable to access the plurality of information contained in the page table of the main memory device, the memory control/interface device comprising:
        a plurality of interface units, each of the plurality of interface units associated with a respective one of the plurality of processing devices;
        a plurality of translation look-aside buffers, each translation look-aside buffer associated with a respective one of the plurality of interface units, each of the plurality of translation look-aside buffers further being associated with the respective one of the plurality of processing devices, each translation look-aside buffer operable to buffer the plurality of information for use in translating in response to the respective one of the plurality of processing devices, wherein each translation look-aside buffer is capable of receiving at least one of the plurality of information from the main memory device; and
        a GART walk device coupled to the plurality of translation look-aside buffers and operable to execute a table walk process to retrieve the plurality of information from the page table of the main memory device for buffering in translation look-aside buffers.

14. The Graphics Address Remapping Table system of claim 13 wherein the GART walk device is operable to arbitrate between the translation look-aside buffers.

15. The Graphics Address Remapping Table system of claim 13 wherein the main memory device is operable to store a page directory containing information for accessing the page table.

* * * * *